United States Patent
Erlichman et al.

[15] 3,643,571
[45] Feb. 22, 1972

[54] PHOTOGRAPHIC FILM ASSEMBLAGE

[72] Inventors: Irving Erlichman, Wayland; Maxwell E. Lawrence, West Acton, both of Mass.

[73] Assignee: Polaroid Corporation, Cambridge, Mass.

[22] Filed: Dec. 19, 1968

[21] Appl. No.: 785,157

[52] U.S. Cl. ........................................95/19, 95/13, 95/31, 95/66
[51] Int. Cl. ....................................................G03b 19/10
[58] Field of Search ........................95/13, 14, 19, 31, 66, 11

[56] References Cited

UNITED STATES PATENTS

| | | | |
|---|---|---|---|
| 3,543,662 | 12/1970 | Erlichman | 95/11 R |
| 2,854,908 | 10/1958 | Eloranta | 95/66 X |
| 2,903,951 | 9/1959 | Land | 95/66 X |
| 2,906,182 | 9/1959 | Booth et al. | 95/66 X |
| 2,989,906 | 1/1961 | Rentschler | 95/31 X |
| 3,046,861 | 6/1962 | Eloranta | 95/13 |
| 3,264,963 | 8/1966 | Finelli | 95/13 |
| 3,350,991 | 11/1967 | Murphy | 95/13 |
| 3,386,361 | 6/1968 | Danti | 95/13 |
| 3,481,261 | 12/1969 | Fischer et al. | 95/31 |
| 3,490,350 | 1/1970 | Hardies et al. | 95/31 |

Primary Examiner—John M. Horan
Assistant Examiner—Thomas A. Mauro
Attorney—Brown and Mikulka, Robert E. Corb and Alfred E. Corrigan

[57] ABSTRACT

A photographic film pack including a container having a forward wall and dependent end and sidewalls formed of a rigid vapor-impermeable material such as sheet metal and an opening at the rear; a plurality of self-developing film units each including a photosensitive element stacked within the container; a support member located behind the stack of film units; a battery located behind the backing member; and a vapor-impermeable closure for the opening at the rear, the closure being displaceable relative to the forward wall. The forward wall includes an exposure opening and one end wall is formed with a withdrawal opening for the film units. A vapor-impermeable cover is removably secured to the container in closing relationship to the exposure and withdrawal openings. The film pack is adapted to be employed in electrically operated photographic apparatus, having a spring-biased pressure member adapted to extend into the container through the opening at the rear for urging the film units toward the forward wall to locate the forwardmost film unit in position for exposure, and spring-biased electrical contacts for engaging the terminals of the battery to couple the battery to electrically energized means within the camera.

26 Claims, 7 Drawing Figures

PATENTED FEB 22 1972

INVENTORS
IRVING ERLICHMAN
and
MAXWELL E. LAWRENCE
BY Brown and Mikulka
and
Alfred E. Corrigan
ATTORNEYS INVENTORS
IRVING ERLICHMAN
and
MAXWELL E. LAWRENCE
BY Brown and Mikulka
and
Alfred E. Corrigan
ATTORNEYS

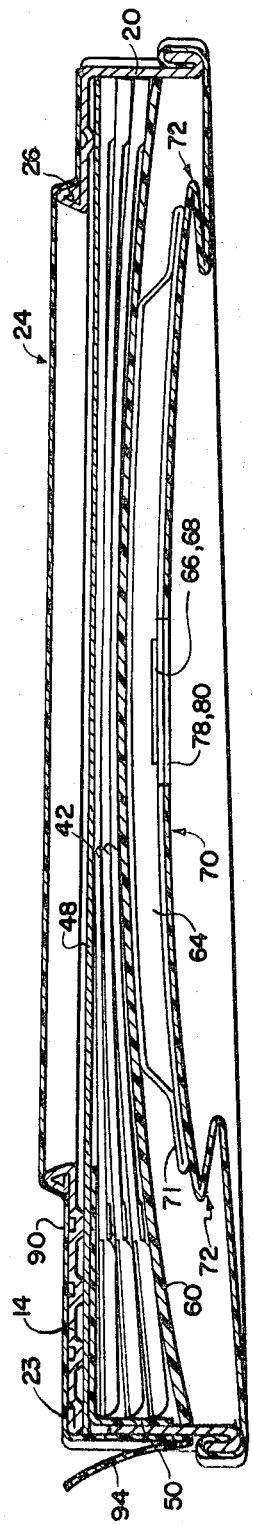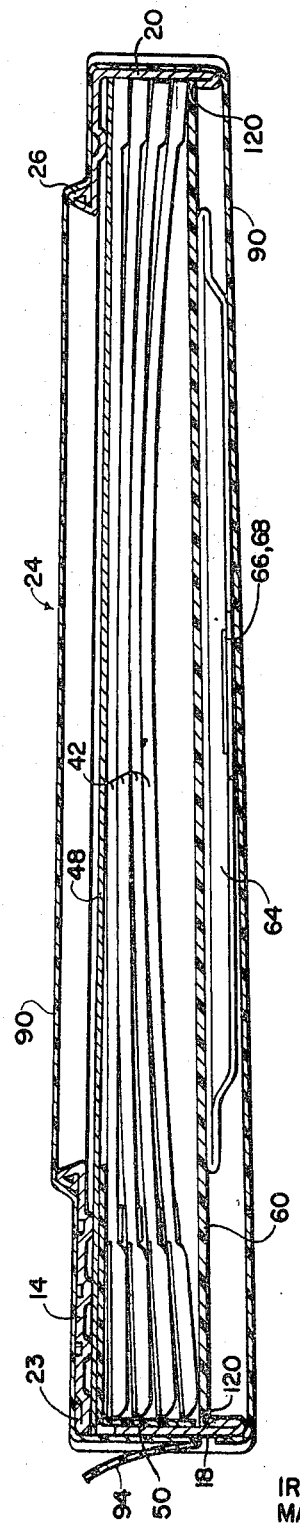

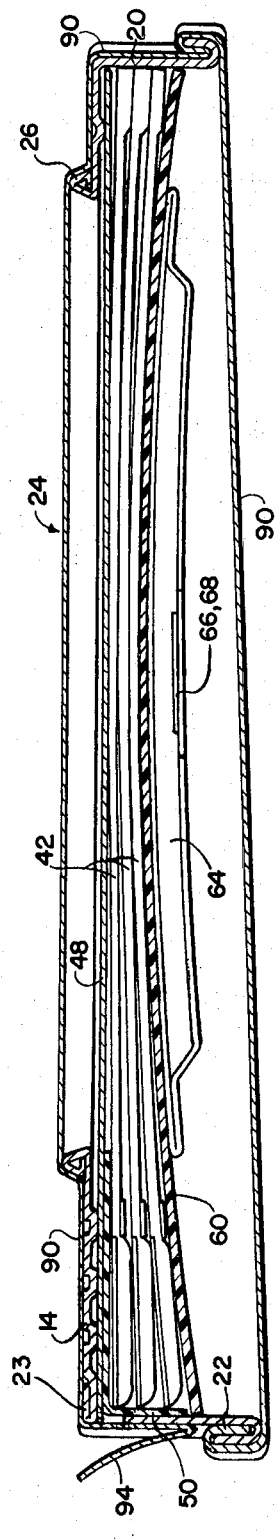

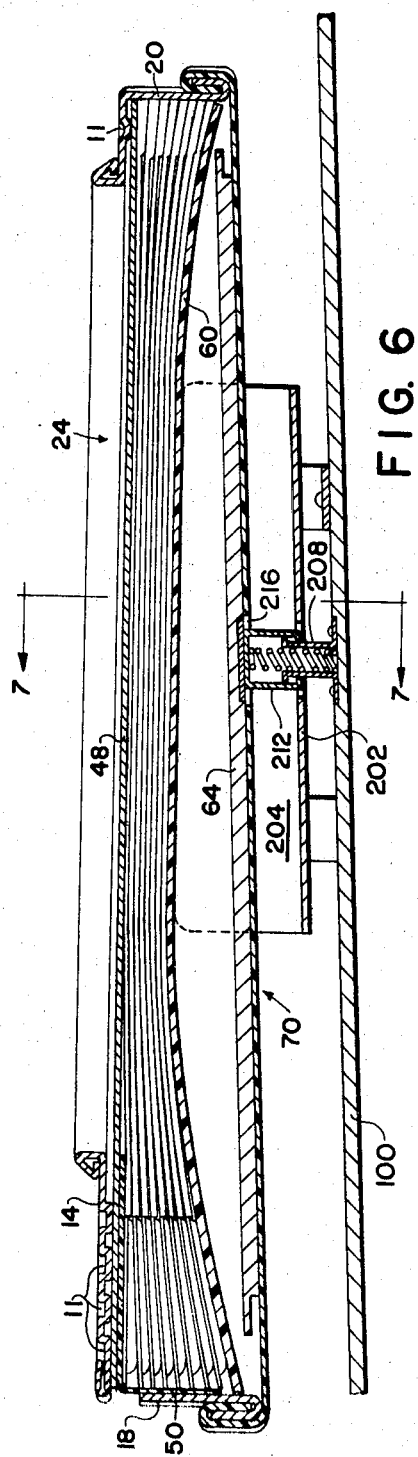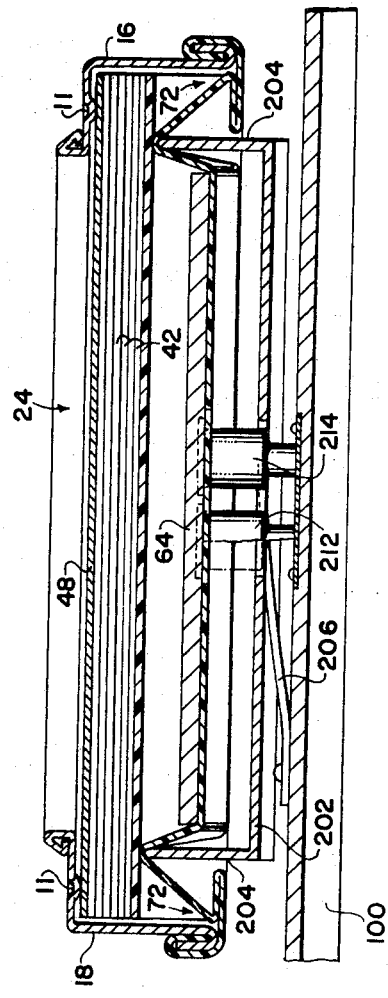
INVENTORS
IRVING ERLICHMAN
and
BY MAXWELL E. LAWRENCE
Brown and Mikulka
and
Alfred E. Corrigan
ATTORNEYS

PHOTOGRAPHIC FILM ASSEMBLAGE

The present invention is concerned with improvements in photographic film assemblages or packs of the type especially adapted to be employed in an electrically operated self-developing camera and including a container and a plurality of film units, each including a photosensitive element, adapted to be exposed within the container, withdrawn therefrom following exposure and then processed. The container is provided with an elongated opening in one end thereof dimensioned to permit the passage of a film unit therethrough and a forward wall having a light-transmitting section or exposure aperture therein. The film units of the above-mentioned type include all of the materials necessary to produce a positive photographic print, including, for example, a photosensitive element, an image-receiving element which is transparent and is secured in face-to-face relation with the photosensitive element, and a rupturable container of processing liquid secured to the leading ends of the elements for dispensing its liquid contents therebetween in response to the application of compressive pressure to the container. The film units are stacked within the container with the leading end of each film unit positioned adjacent an end wall and with a forwardmost film unit positioned with its photosensitive side facing in the direction of said forward wall in position for exposure to light transmitted through said light-transmitting section and an end in alignment with the elongated opening.

Heretofore, it has been the practice in film packs of this type to provide support means in the form of a spring-biased platen within the film container for engaging the rearmost film unit, that is, the film unit furthest from the forward wall and for urging the film units toward the forward wall to position the forwardmost film unit against the forward wall in position for exposure to light admitted through the light-transmitting section. The entire film assemblage is then enclosed in an opaque package or wrapper which is impervious to vapor, particularly water vapor, which may change the moisture content of the photosensitive and/or image-receiving elements. Changes in moisture content may result in both physical and chemical changes in the sheet material which may, in turn, adversely affect exposure and/or processing of the film unit. However, furnishing each film assemblage with a spring-biased platen and enclosing the assemblage in a separate outer moisture-impermeable package or wrapper, as has been the prior art practice, adds substantially to the final cost of the assemblage.

An object of the invention is to provide in a film assemblage of the type described, a film container which is not required to be packaged in a separate outer wrapper or container of vapor-impermeable material.

Another object of the invention is to provide a film assemblage of the type described including a film container which functions as a part of a vapor-impermeable enclosure for the film units of the film assemblage.

A further object of the invention is to provide a film assemblage of the type described which does not incorporate a spring-biased pressure plate and which is adapted for use with a camera or other photographic apparatus having a spring-biased pressure plate.

Still another object of the invention is to provide in a film assemblage of the type described, a battery adapted to cooperate with electrically energized components of a camera or other photographic apparatus, which function to expose and/or process the film unit container in the film assemblage.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGS. 3 through 6 are side views, partly in section, of various embodiments of the film assemblage of FIG. 1; and FIG. 7 is a view of the film assemblage of FIG. 6 taken along line 7—7.

Figure 1:
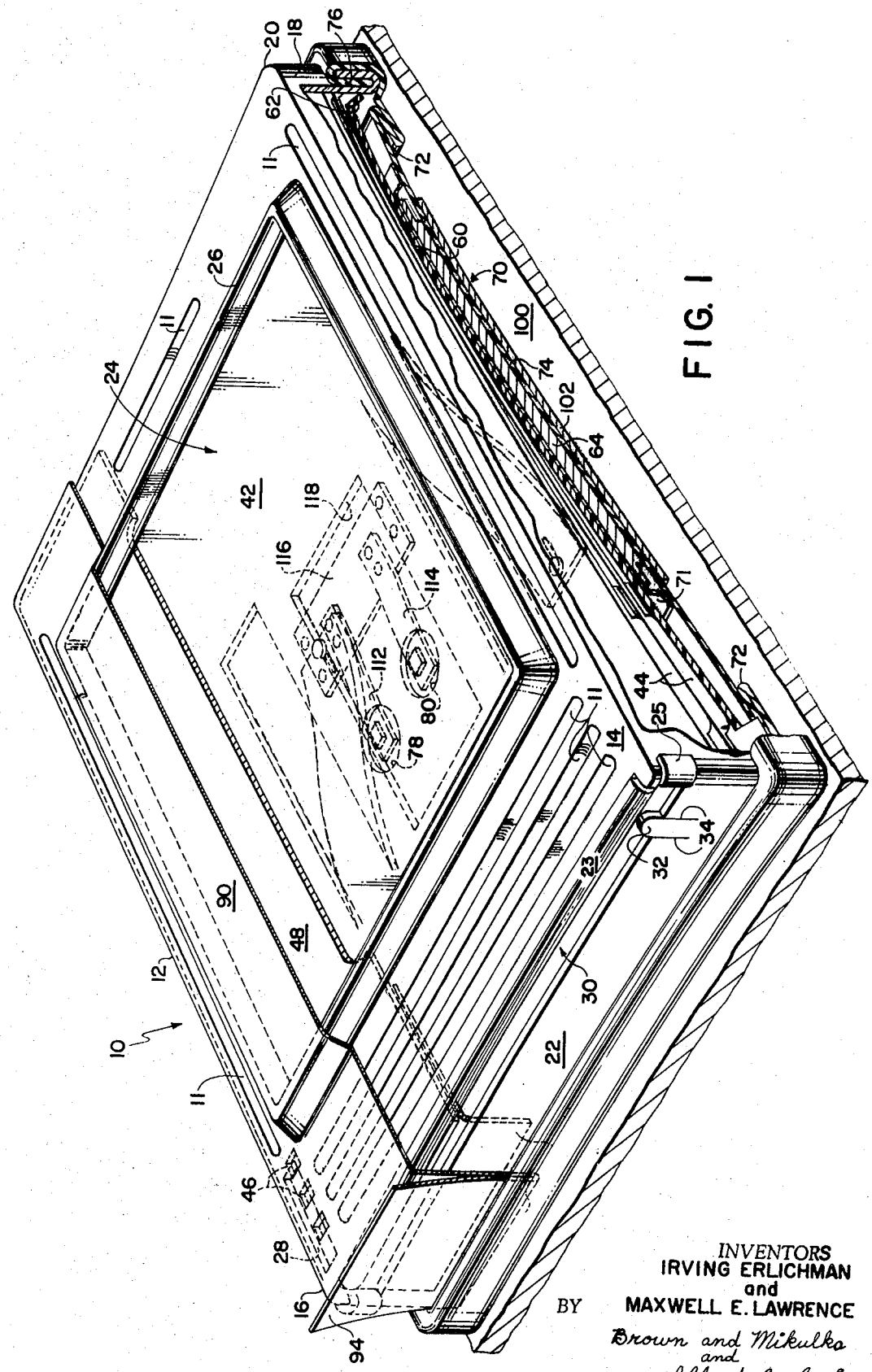
FIG. 1 is a perspective view, partly in section, of the film assemblage of the instant invention.
Figure 2:
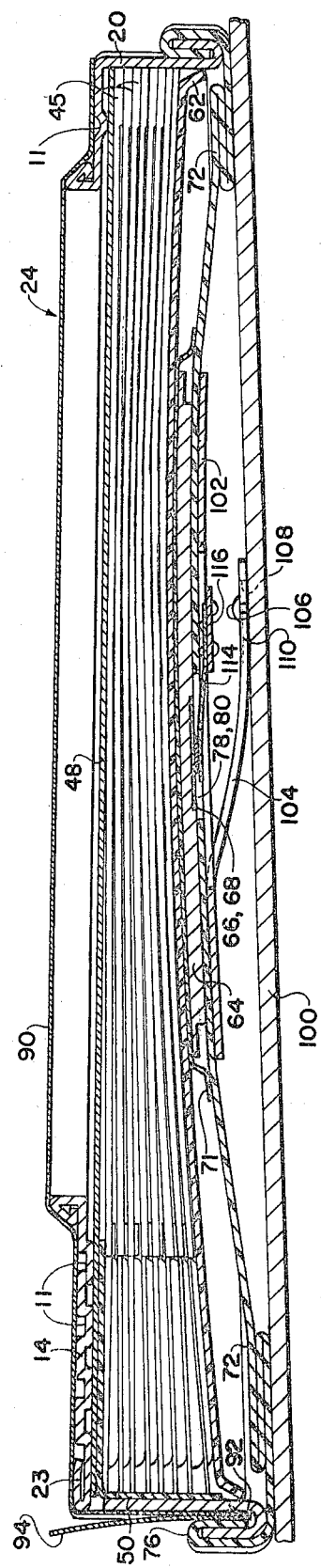
FIG. 2 is a side view, partly in section, of the film assemblage of FIG. 1.

Reference is now made to FIGS. 1 and 2 wherein there is illustrated a film assemblage or pack denoted generally by reference numeral 10. The thicknesses of the various materials have been exaggerated for purposes of clarity of illustration and do not necessarily reflect the relative thickness of the actual components. Film assemblage 10 includes a container 12, formed of vapor-impermeable, rigid material such as metal, for example, aluminum or steel, having a generally planar forward wall 14, and sidewalls 16, 18 and end walls 20, 22 dependent from the forward wall. The container shown is designed to be fabricated from sheet metal, and for this reason, the corners at the junctures of the end and sidewalls are curved. Forward wall 14 has a light-transmitting section or exposure aperture 24 therein defined by a stiffening flange 26 formed by bending edge portions of the forward wall upon themselves as shown in FIG. 2; and an elongated slot 28 for receiving means mounted in a camera or other photographic apparatus for engaging and moving the forwardmost film unit from the container. Wall 14 is embossed inwardly to form a plurality of ribs 11 for increasing the stiffness and rigidity of the wall. The inner surfaces of ribs 11 are located in a common plane which preferably corresponds with the focal plane of the camera lens or optical system of other photographic apparatus with which the film assemblage is adapted to be employed. End wall 22 includes an elongated opening 30, extending substantially from side to side of the container, through which film units are adapted to be moved subsequent to exposure. The edge portion 23 of forward wall 14 adjacent opening 30 is folded outwardly upon itself to further stiffen the wall structure while lateral edge portions 25 are folded laterally outward to provide rounded corners for the end edges of opening 30. End wall 22 further includes as an integral part thereof an extension 32 which extends partly across opening 30 to prevent the movement of more than one film unit at a time through opening 30. Extension 32 is provided with a slit 34 along each side thereof to increase its resiliency. It should be noted that end walls 20 and 22 are not planar but are slightly bowed towards each other to keep the corners of the film units out of the curved interior surfaces of the corners of container 12 thus substantially reducing the possibility of one of the sharp corners of a film unit binding against the rounded interior surface of an interior corner of the container so as to inhibit forward displacement of the film units.

Positioned within the container 12 are a plurality of film units 42, of the type shown and described in detail in the copending U.S. Patent applications of Edwin H. Land, Ser. No. 622,287 filed on Mar. 10, 1967, and Edwin H. Land et al., Ser. No. 622,286, filed Mar. 10, 1967, now abandoned. Each film unit 42 preferably includes all of the materials necessary to produce a positive photographic print and includes a photosensitive element, an image-receiving element which is transparent and is secured in face-to-face relation with the photosensitive element and a rupturable container 44 of processing liquid secured to the leading ends of the photosensitive and image-receiving elements for dispensing its liquid contents therebetween in response to the application of compressive pressure to the container 44. Each film unit is adapted to be processed by advancing the film unit with container 44 foremost, between a pair of pressure-applying members, e.g., rolls, which dispense the liquid contents of the container 44 therefrom between the photosensitive and image-receiving elements and spread the liquid between and in contact with the two elements toward the trailing end thereof. Each film unit is provided near one lateral edge thereof with a plurality of apertures (not shown), some of which are in alignment with slot 28, which are adapted to receive means in the camera or other apparatus for cooperating with the apertures to move the film unit from the container 12 via the aforementioned withdrawal slot 30. At this point it should be noted that the thickness of each film unit varies from the leading end portion, i.e., container 44, toward the trailing end portion. The leading end of the film unit is of maximum thickness because of container 44; the trailing end is of an intermediate thickness due in part to the traps 45 provided thereat to collect any surplus processing liquid; and the portion therebetween including the exposure area is of a minimum thickness. Accordingly, the end of container 12 having withdrawal opening 30 is of a greater thickness or depth than the opposite end of the container.

Positioned between the film unit 42 located adjacent the light-transmitting section or exposure aperture 24 and forward wall 14 is a safety cover in the form of an opaque sheet of relatively rigid material 48 and a flexible skirt 50. Sheet 48 is substantially coextensive with forward wall 14 and includes a plurality of apertures 46 for receiving means for moving the safety cover through slot 30. Flexible skirt 50 is made from any suitable material, e.g., polyethylene, which is opaque and is secured to the underside of sheet 48. Section 50 extends across withdrawal opening 30 and apertures 46 to prevent the admission of light through said opening and apertures.

A support member 60, formed of a relatively rigid sheet material such as an organic plastic or metal, engages and supports the rearmost film unit 42. Member 60, which is substantially coextensive with film unit 42, may have its peripheral margins 62 turned downwardly, as viewed in FIG. 1, to stiffen the member, provide a light seal between member 60 and the walls 16, 18, 20 and 22 and to provide ease of movement of member 60 toward exposure aperture 24 and increased resistance to movement of member 60 away from the exposure aperture. In an alternative embodiment, member 60 is slightly longer than the inside length dimension of the container and this coupled with its resiliency causes member 60 to assume a bowed condition conforming more closely to the shape of the rearmost film unit. Member 60 is preferably formed of flat, resilient sheet material or a material having a "memory" such that it tends to return to a flat condition when stresses thereon are removed.

A battery 64 is provided in the container shown mounted on the rear of member 60 and is shown as being sufficiently flexible to conform to the contour of support member 60. Battery 64 is provided for energizing components of the camera or other apparatus employed to expose and/or process the film such as a shutter, illuminating device or a motor for driving means for advancing a film unit from the container subsequent to exposure and move the film unit into the nip of a pair of pressure-applying members, e.g., rolls, which process the film unit as will be more clearly explained hereinafter. Battery 64 includes terminals 66 and 68 located on the same side of the battery, namely, the rear or side opposite to that in engagement with member 60. Although a single battery has been shown herein, it is to be understood that the term battery is intended to encompass a power supply comprised of one or more primary cells, e.g., two or more independent cells connected in series or parallel.

The rear of container 12 is hermetically sealed by an opaque, vaporimpermeable closure material in the form of a sheet 70 which may be flexible or relatively inflexible and has sufficient strength to support the film units and member 60 within the container 12. In the form shown in FIGS. 1 and 2, sheet 70 is flexible and includes pleated portions 72 which are folded upon themselves around the periphery of sheet 70 to enable the central portion 74 to be displaced forwardly toward forward wall 14 under the urging of an external force. The rear edge portions of walls 16, 18, 20 and 22 are turned outwardly and forwardly (as viewed in FIG. 1) and are used to crimp the peripheral edges 76 of sheet 70 to the side and end walls to form a vaporproof seal thereby securing sheet 70 to container 12. Section 74 of sheet 70 includes a pair of apertures 78, 80 therein located in alignment with battery terminals 66, 68 for receiving a pair of contacts as will be explained shortly hereafter. The peripheral portions of the forward surface wall 70 of surrounding apertures 78, 80 are suitably sealed to the rear surface of the battery to prevent admission of vapor between the battery and sheet 70. A sheet 71 of vapor-impermeable material is attached to sheet 70 and cooperates with sheet 70 to form an envelope completely enclosing the battery except for apertures 78, 80 to prevent any vapors given off by the battery from reaching the film units. Apertures 78 and 80 may be formed by weakening the area of sheet 70 corresponding to the periphery of apertures 78, 80 and removing the weakened portion prior to inserting the film assemblage into a camera. Although the battery has been shown as mounted on member 60, it is within the scope of the instant invention to mount it on either side of sheet 70.

As a closure for the exposure aperture 24 and withdrawal opening 30, there is provided a vapor-impermeable sheet 90, e.g., a laminate comprised of layers of metal foil, paper, and a polymer, sealed, e.g., by an adhesive, to forward wall 14 and extends across exposure aperture 24, slot 28 and then rearwardly (as seen in FIG. 1) along end wall 22 and across withdrawal opening 30 and is sealed to the end wall around the withdrawal opening. The end of sheet 90 is folded upon itself to form a V-shaped section 92 terminating in a tab 94, the V-shaped section 92 being releasably wedged between edge 76 of sheet 70 and wall 22. Alternatively, section 92 can terminate at a position short of the upturned flange of wall 22 and be adhesively secured thereto. Sheet 90 thus completes the vapor barrier which surrounds the film units and of which container 12 is a component. The adhesive used to secure sheet 90 to container 12 should be of the type which will maintain a hermetic seal therebetween and yet enable sheet 90 to be easily removed from container 12. Although sheet 90 is shown attached to the container when it is positioned adjacent door 100, it is to be understood that it is removed prior to loading the container into the camera.

Mounted on a rear wall or loading door 100 of a camera is a resilient, platenlike pressure member in the form of a plate 102 having integral cantilever springs 104 extending from the plate to wall 100 whereat they are slidably secured to wall 100 by fasteners 106 extending through elongated slots 108 in the end portions 110 of legs 104. A pair of resilient contacts 112, 114 are secured to the underside of plate 102 by a strip of nonconducting material 116 and are adapted to extend through an opening 118 in plate 102. Contacts 112, 114 are adapted to engage the terminals 66, 68 of battery 64 upon positioning of the film assemblage 10 in the aforementioned camera. Contacts 112, 114 are provided with suitable wiring to direct a flow of current from the battery to the electrically energized components of the camera or accessory associated therewith.

When it is desired to load film assemblage 10 into a camera of the type described above, tab 94 is pulled to free section 92 from the crimping action of wall 22 and portion 76 of sheet 70. It should be noted that the crimping action on section 92 is such that it may be withdrawn without detaching sheet 70 from wall 22. Once section 92 is free, the remainder of sheet 90 is removed from container 12. The film unit is then positioned within the aforementioned camera and the loading door 100 closed bringing contacts 112 and 114 into engagement with battery terminals 66 and 68 and pressure plate 102 into engagement with closure sheet 70 for urging the film units toward forward wall 14. In the preferred form of camera shown and described, actuation of the shutter mechanism of the camera completes a circuit to an electric motor for operating a reciprocating picklike member adapted to enter slot 28 and one of the apertures 46 in safety cover 48 to move the latter through opening 30 and into the bite of a pair of rolls and rotate the rolls to advance the cover therebetween to the exterior of the camera. The forwardmost film unit is now ready for exposure.

In an alternative embodiment of the film assemblage the pleated flexible sheet 70 may be replaced by a sheet of elastomer thereby obviating the need for pleats or by a substantially rigid sheet having pleats near the ends adjacent walls 20, 22. If the elastomer or rigid sheet is not vapor-impermeable, overlay sheet 90 would be extended to cover those sections of container 12 which are not covered by a vapor-impermeable material, e.g., as shown in FIGS. 4 and 5.

FIG. 3 shows an embodiment of the photographic film assemblage in which battery 64 is attached to a medial portion of vapor-impermeable sheet 70 and is separated from the film units by a second sheet of vapor-impermeable material 71 which is secured to sheet 70. Again, sheet 70 includes pleats or folded sections 72 which tend to unfold toward wall 14 and also allow the battery to move support member 60 and the film units toward forward wall 14 under the urging of pressure plate 102. Also, note should be made that support member 60 may be slightly longer in length than the length of container 12 instead of having the downturned portions 62, and still accomplish the same functions, i.e., one-way clutch effect and light seal.

FIG. 4 shows still another modification of film assemblage 10. Here, the lower ends of walls 16, 18, 20 and 22 are turned inwardly, i.e., towards the interior of container 12 to form support surfaces 120 for support member 60. Support member 60 may be slightly bowed as in FIG. 3 or it may be substantially flat as shown herein in its position outside of the camera. Also, sheet 70 has been eliminated and sheet 90 extended to cover wall 20 and the entire rear of container 12. FIG. 5 shows an embodiment similar to FIG. 4 except that the ends of the end and sidewalls are turned outwardly and upwardly; support member 60 is bowed; and sheet 90 is again lengthened to encompass walls 22, 14, 20 and the rear of the container and is crimped between wall 20 and its upturned end and between wall 22 and its upturned end. In both FIGS. 4 and 5 the battery is enclosed in a vapor-impermeable material in a manner similar to that described above. In FIGS. 3–5 the film assemblage has been shown as including only three or four film units in order to more clearly show the other elements of the assemblage and their cooperation with the film units.

FIG. 6 shows a further embodiment of the film assemblage of the instant invention wherein the battery 64 is restrained against movement relative to forward wall 14 by a flexible and nonelastic sheet 70. In this embodiment pleats 72 in sheet 70 appear only along those portions of the sheet which are located adjacent walls 16 and 18. A pressure member 202 having upturned flanges 204 which are generally parallel with walls 16 and 18, is mounted on door 100. Resilient means in the form of springs 206 are provided for biasing pressure member 202 forwardly. Member 202 is formed with an aperture 208 therein for receiving a pair of electrical contacts mounted on resiliently biased members 212 and 214. Upon inserting the film assemblage into the camera and closing door 100, flanges 204 engage sheet 70 only at the pleated portions adjacent sidewalls 16 and 18 to move those portions of sheet 70 into engagement with support member 60 to urge the latter and the film units toward forward wall 14 without moving battery 64. Contacts 212 and 214 are independently biased into engagement with battery terminals 66, 68 via opening 216 formed in sheet 70. Except for the area immediately above opening 216, the battery is enclosed in a vapor-impermeable material substantially as set forth above. Alternatively, closure sheet 70 could be replaced by a vapor-impermeable rigid sheet having three openings therein. The battery would be mounted on the rigid sheet with its terminals located in line with one of the three openings. The other two openings, which would be located adjacent walls 16, 18, intermediate their ends, would be adapted to receive two spring biased, fingerlike members which would pass on opposite sides of the battery and contact pressure plate 60 directly while the contacts 212, 214 could be making independent contact with the battery terminals.

It can be seen from the foregoing that there has been disclosed a film assemblage of a relatively low cost, said low cost being realized by eliminating the spring and pressure member from the assemblage and designing it for use with a camera having a spring pressure member as a component thereof; and by reducing the cost of packaging the film container in a separate vapor-impermeable wrapper or container by manufacturing the film container from a vapor-impermeable material and securing a vapor-impermeable material to the container itself only where needed to seal openings in the container and completely enclose the film units with a vapor-impermeable container.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. A photographic film assemblage comprising, in combination:
    a container having vapor-impermeable forward, side, and end walls and an opening at the rear, said forward wall having a light-transmitting section therein;
    a plurality of film units arranged in stacked relation within said container with one of said film units located against said forward wall in position for exposure to light transmitted through said light-transmitting section;
    a support member for engaging and supporting the film unit located furthest from said forward wall;
    a battery mounted within said container behind said support member and including terminals located in position to be engaged by electrical contacts located behind said battery and urged toward said forward wall; and
    a vapor-impermeable closure for said opening at the rear of said container secured to said container and including at least a section displaceable relative to said forward wall.

2. A photographic film assemblage as defined in claim 1 wherein said closure is formed of an elastomer.

3. A photographic film assemblage as defined in claim 1 wherein said forward, side, and end walls of said container are formed of a relatively rigid material, and said closure is formed of a relatively flexible sheet material secured to said side and end walls by a vapor-impermeable seal.

4. A photographic film assemblage as defined in claim 1 wherein said closure is formed of a sheet material and includes at least portions displaceable toward said forward wall.

5. A photographic film assemblage as defined in claim 4 wherein said closure is attached by crimping to said side and end walls.

6. A photographic film assemblage as defined in claim 4 wherein said portions of said closure are located adjacent at least said sidewalls and are pleated.

7. A photographic film assemblage as defined in claim 6 wherein said portions of said closure are located adjacent both of said side and end walls and are pleated.

8. A photographic film assemblage comprising, in combination:
    a container having a vapor-impermeable forward, side, and end walls and an opening at the rear, said forward wall having a light-transmitting section therein;
    a plurality of film units arranged in stacked relation within said container with one of said film units located against said forward wall in position for exposure to light transmitted through said light-transmitting section;
    a support member for engaging and supporting the film unit located furthest from said forward wall;
    a vapor-impermeable closure for said opening at the rear of said container secured to said container, said closure being formed of a sheet material and including pleated portions located adjacent at least said sidewalls, said pleated portions being displaceable toward said forward wall; and
    a battery mounted on said closure intermediate said pleated portions thereof.

9. A photographic film assemblage comprising, in combinaa container having vapor-impermeable forward, side, and end walls and an opening at the rear, said forward wall having a light-transmitting section therein;

a plurality of film units arranged in stacked relation within said container with one of said film units located against said forward wall in position for exposure to light transmitted through said light-transmitting section;

a support member for engaging and supporting the film unit located furthest from said forward wall;

a vapor-impermeable closure for said opening at the rear of said container secured to said container, said closure being formed of a sheet material and including at least portions displaceable toward said forward wall; and a battery mounted on said closure.

10. A photographic film assemblage as defined in claim 9 wherein said battery is mounted on the inside of said closure.

11. A photographic film assemblage as defined in claim 10 wherein said battery includes terminals located in position to be engaged by electrical contacts located behind said battery and said closure includes at least one opening providing access to said battery terminals and is secured to said battery around said opening by a vapor-impermeable seal.

12. A photographic film assemblage as defined in claim 9 wherein said battery is mounted on the outside of said closure.

13. A photographic film assemblage as defined in claim 1 wherein said light-transmitting section comprises an opening in said forward wall, one of said end walls is formed with an opening through which said one film unit is movable, and said film assemblage includes a vapor-impermeable sheet material removably secured to said container in closing relation to said openings in said forward and one end walls.

14. A photographic film assemblage as defined in claim 13 wherein said vapor-impermeable sheet material extends around and to the rear of said container to form said closure.

15. A photographic film assemblage as defined in claim 1 wherein said battery is mounted on said support member between the latter and said closure.

16. A photographic film assemblage comprising, in combination:
a container having vapor-impermeable forward, side, and end walls and an opening at the rear, said forward wall having a light-transmitting section therein;
a plurality of film units arranged in stacked relation within said container with one of said film units located against said forward wall in position for exposure to light transmitted through said light-transmitting section;
a support member movable within said container toward said forward wall for engaging and supporting the film unit located furthest from said forward wall;
means limiting movement of said support member away from said forward wall; and
a vapor-impermeable closure for said opening at the rear of said container, said closure being removable to enable resilient means to urge said support member and said film units toward said forward wall.

17. A photographic film assemblage comprising, in combination:
a container having vapor-impermeable forward, side, and end walls and an opening at the rear, said forward wall having a light-transmitting section therein;
a plurality of film units arranged in stacked relation within said container with one of said film units located against said forward wall in position for exposure to light transmitted through said light-transmitting section;

a support member for engaging and supporting the film unit located furthest from said forward wall;
a vapor-impermeable closure for said opening at the rear of said container secured to said container and including at least a section displaceable relative to said forward wall; and
a battery mounted on said closure within said container and behind said support member, said battery including terminals located in position to be engaged by electrical contacts located behind said battery and urged toward said forward wall.

18. A photographic film assemblage comprising, in combination:
a container having vapor-impermeable forward, side, and end walls and an opening at the rear, said forward wall having a light-transmitting section therein;
a plurality of film units arranged in stacked relation within said container with one of said film units located against said forward wall in position for exposure to light transmitted through said light-transmitting section;
a support member for engaging and supporting the film unit located furthest from said forward wall;
a vapor-impermeable closure for said opening at the rear of said container, said closure including a vapor-impermeable envelope secured to said end and sidewalls and including at least a section displaceable relative to said forward wall; and
a battery mounted within said envelope behind said support member, said battery including terminals located in position to be engaged by electrical contacts located behind said battery and urged toward said forward wall.

19. A photographic film assemblage as defined in claim 18 wherein portions of said envelope adjacent at least said sidewalls are pleated.

20. A photographic film assemblage as defined in claim 1 wherein said film units are rectangular, said forward wall is substantially rectangular, said end and sidewalls depend therefrom and the corners of said container at the junctures of said end and sidewalls are rounded.

21. A photographic film assemblage as defined in claim 20 wherein opposite walls of said container are bowed inwardly toward one another.

22. A photographic film assemblage as defined in claim 21 wherein said end walls are bowed toward one another and engage the end edges of said film units intermediate the corners thereof.

23. A photographic film assemblage as defined in claim 22 wherein one of said end walls is provided with an opening through which said one film unit is movable.

24. A photographic film assemblage as defined in claim 23 wherein said sidewalls are substantially linear and parallel with the lateral edges of said film units for guiding said film units through said opening in said one end wall.

25. A photographic film assemblage as defined in claim 1 wherein said container includes a rear wall formed of a relatively rigid, vapor-impermeable material, said opening at the rear of said container is formed in said rear wall, and said closure for said opening is secured across said opening.

26. A container as defined in claim 16 further including a battery mounted on said support member, said battery including terminals located in position to be engaged by resiliently mounted electrical contacts for urging said battery, said support member, and said film units towards said forward wall.

* * * * *